United States Patent [19]

Iinuma et al.

[11] Patent Number: 5,175,514
[45] Date of Patent: Dec. 29, 1992

[54] DIGITAL MODULATOR AND BASEBAND SIGNAL GENERATOR FOR DIGITAL MODULATOR

[75] Inventors: Toshinori Iinuma, Gifu; Mitsufumi Yoshimoto, Nara; Hama Mitsuji; Akio Kosaka, both of Gifu, all of Japan

[73] Assignees: Sanyo Electric Co., Ltd.; Tottori Sanyo Electric Co., Ltd., both of Japan

[21] Appl. No.: 825,938

[22] Filed: Jan. 27, 1992

[30] Foreign Application Priority Data

Jan. 29, 1991 [JP] Japan ................................ 3-9326
Jul. 17, 1991 [JP] Japan ............................... 3-176841

[51] Int. Cl.⁵ .......................................... H03C 5/00
[52] U.S. Cl. ....................................... 332/103; 375/53
[58] Field of Search ..................... 332/103, 104, 105; 375/38, 53, 54, 67

[56] References Cited

U.S. PATENT DOCUMENTS 4,680,777 7/1987 Saha ................... 332/103
4,910,474 3/1990 Tjahjadi et al. ............ 332/103
5,077,757 12/1991 Cahill ...................... 375/67

FOREIGN PATENT DOCUMENTS 0190063 7/1990 Japan ................. 332/103

OTHER PUBLICATIONS

Yongacoglu et al., "Differential Detection of GMSK Using Decision Feedback", *IEEE Transactions on Communications*, vol. 36, No. 6, Jun. 1988, pp. 641-649.
Murota et al., "GMSK Modulation for Digital Mobile Telephony", *IEEE Transactions on Communications*, vol. com-29, No. 7, Jul. 1981, pp. 1044-1050.

Primary Examiner—Robert J. Pascal
Attorney, Agent, or Firm—Peter L. Michaelson

[57] ABSTRACT

A digital modulator includes a signal source for a digital baseband signal and a signal source for carrier phase information. The digital baseband signal is converted into amplitude information of an I phase, a Q phase, an I' phase and a Q' phase by a mapping circuit. The carrier phase information is converted into four phase information with phases shifted by shift registers to be out of phase by $\pi/4$ from each other. The digital modulator includes four ROM, each ROM outputting a multiplication result of the corresponding amplitude information and carrier signal based on the corresponding one of the four amplitude information as a higher order address and the corresponding one of the four phase information as a lower order address. These outputs are added to each other in a digital manner and then converted into an analog signal which is supplied as a modulated signal.

13 Claims, 14 Drawing Sheets

FIG.8

| HIGHER ORDER ADDRESS | LOWER ORDER ADDRESS | STORAGE CONTENTS |
|---|---|---|
| BASEBAND SIGNAL | PHASE COUNTER VALUE (PHASE) | MULTIPLICATION DATA |
| A | 0 (0) | 0 (A x SIN 0) |
| B | 1 ($\pi/4$) | $B/\sqrt{2}$ (B x SIN $\pi/4$) |
| C | 2 ($\pi/2$) | C (C x SIN $\pi/2$) |
| D | 3 ($3\pi/4$) | $D/\sqrt{2}$ (D x SIN $3\pi/4$) |
| E | 4 ($\pi$) | 0 (E x SIN $\pi$) |
| F | 5 ($5\pi/4$) | $-F/\sqrt{2}$ (F x SIN $5\pi/4$) |
| G | 6 ($3\pi/2$) | $-G$ (G x SIN $3\pi/2$) |
| H | 7 ($7\pi/4$) | $-H/\sqrt{2}$ (H x SIN $7\pi/4$) |

FIG. 9A

| BASEBAND SIGNAL | D0 | D1 | D2 | D3 | D4 | D5 | D6 | D7 |
|---|---|---|---|---|---|---|---|---|
| I PHASE COMPONENT | D0 | | D2 | | D4 | | D6 | |
| Q PHASE COMPONENT | D1 | | D3 | | D5 | | D7 | |

FIG. 9B

| BASEBAND SIGNAL | D0 | D1 | D2 | D3 | D4 | D5 | D6 | D7 |
|---|---|---|---|---|---|---|---|---|
| I PHASE COMPONENT | D0 | | 0 | | D4 | | 0 | |
| I' PHASE COMPONENT | 0 | | D2 | | 0 | | D6 | |
| Q PHASE COMPONENT | D1 | | 0 | | D5 | | 0 | |
| Q' PHASE COMPONENT | 0 | | D3 | | 0 | | D7 | |

DIGITAL MODULATOR AND BASEBAND SIGNAL GENERATOR FOR DIGITAL MODULATOR

BACKGROUND OF THE INVENTION

1. Field of the Invention

The present invention relates generally to digital modulators and baseband signal generators for digital modulators, and more particularly, to digital modulators used as MODEMs for digital communication equipments such as a land mobile radio telephone, a portable radio telephone and a cordless telephone, and baseband signal generators for such digital modulators.

2. Description of the Background Art

A conventional digital communication apparatus modulates a carrier signal in response to a digital information signal (baseband signal) to transmit the information signal in order to achieve efficient transmission.

Such modulation systems include an amplitude modulation system wherein an amplitude of a carrier signal is changed in response to a digital baseband signal (a modulating wave signal), a frequency modulating system, wherein a frequency of a carrier is deviated in response to a modulating wave signal, a phase modulating system wherein a phase of a carrier is changed in response to a modulating wave signal and an amplitude phase modulating system wherein an amplitude and a phase of a carrier are individually changed in response to a modulating wave signal.

The carrier signal (modulated signal) S(t) thus modulated in response to a modulating wave signal can be generally expressed by the following equations.

$$\begin{aligned} S(t) &= A(t)\sin\{\omega ct + \phi(t)\} \\ &= A(t)\sin\phi(t) \cdot \cos\omega ct + \\ &\quad A(t)\cos\phi(t) \cdot \sin\omega ct \end{aligned} \quad (1)$$

Herein, A(t) denotes an amplitude, $\omega c$ denotes a carrier frequency and $\phi(t)$ denotes a phase of a modulating wave signal.

As is clear from the above-described equation (1), the modulated signal can be represented by two components orthogonal to each other, that is, by a sum of an in-phase (I phase) component (the first term of the above-described equation (1)) and a quadrature phase (Q phase) component (the second term of the above-described equation (1)). Such a modulated signal can be therefore formed by using a quadrature modulator.

FIGS. 1 and 2 are a block diagram and a spatial diagram schematically showing the principle of such a quadrature modulator, respectively. It should be noted that the following example shows a phase modulating system for changing a phase of a carrier in response to a baseband signal, wherein an amplitude A (t) is fixed to "1".

With reference to FIG. 1, a mapping circuit 2 outputs I phase and Q phase components of a modulating wave signal as rectangular signals in response to a digital baseband signal applied through an input terminal 1. The I phase component is applied to one input of a multiplier 7 through a low pass filter (LPF) 3, while the Q phase component is applied to one input of a multiplier 8 through a low pass filter LPF 4.

A carrier signal $\cos\omega ct$ is applied from a signal source 5 to the other input of the multiplier 7 which outputs an I phase component $\sin\phi(t)\cdot\cos\omega ct$ of a modulated signal. A signal $\sin\omega ct$ obtained by shifting the phase of the carrier signal from the signal source 5 by $\pi/2$ by means of a phase shift circuit 6 is applied to the other input of the multiplier 8 which outputs an Q phase component $\cos\phi(t)\cdot\sin\omega ct$ of the modulated signal. Thus obtained I phase component and Q phase component can be represented in a one-to-one correspondence on the I and Q coordinates as shown in FIG. 2.

These I phase component and Q phase component are added to each other by an adder 9 to become such a modulated signal as expressed by equation (1), which signal is output from an output terminal 10.

FIG. 3 is a block diagram showing a GMSK (Gaussian filtered Minimum Shift Keying) modulator as an example of the quadrature modulator shown in FIG. 1. Such GMSK modulator is disclosed in, for example, "Differential Detection of GMSK Using Decision Feedback" by Abbas Yongacoglu et al., IEEE TRANSACTIONS ON COMMUNICATIONS, VOL. 36, No. 6, JUNE 1988, pp. 641-649 and "GMSK Modulation for Digital Mobile Radio Telephony" by Kazuaki Murota et al., IEEE TRANSACTIONS ON COMMUNICATIONS, VOL. COM-29, No. 7, JULY 1981, pp. 1044-1050.

In FIG. 3, the portion 2 surrounded by the chain dotted line shows the details of the structure corresponding to the mapping circuit 2 and LPFs 3 and 4 of FIG. 1.

First, a digital baseband signal applied through the input terminal 1 is applied to a gaussian filter 14. More specifically, the gaussian filter 14 comprises a shift register 14a for taking the digital baseband signal by R bits and converting the same into R bit parallel data in response to a first clock signal applied from a clock signal source (not shown) through an input terminal 12 for every bit period T, a binary counter 14b for counting and outputting S bit data in response to a second clock signal applied from the clock signal source (not shown) through an input terminal 13 and having a frequency higher than that of the first clock signal, and a ROM type low pass filter 14c from which L bit data indicating a phase shift amount $\Delta\phi(t)$ of a modulating wave signal is read, with the R bit output data of the shift register 14a as a higher order address and the S bit output data of the binary counter 14b as a lower order address.

The L bit data indicating the phase shift amount $\Delta\phi(t)$ is applied to an integration circuit 15 including an adder 15a and a one-clock delay unit 15b. The integration circuit 15 integrates the applied phase shift amount $\Delta\phi(t)$, outputs P bit data indicating the phase $\phi(t)$ of the modulating wave and applies the data to ROMs 16 and 17.

The ROM 16 includes a ROM table including I phase component data of the modulating wave signal and outputs the corresponding I phase component data of W bits in response to the data indicating the phase $\phi(t)$ from the integration circuit 15 as an address. The ROM 17 includes a ROM table including Q phase component data of the modulating wave signal and outputs the corresponding Q phase component data of W bits in response to the data indicating the phase $\phi(t)$ from the integration circuit 15 as an address.

The digital I phase component data output from the ROM 16 is converted into an analog I phase component signal $\sin\phi(t)$ by a D/A converter 18 and applied to one input of the multiplier 7 through the LPF 3' in order to suppress sampling noises. The digital Q phase component data output from the ROM 17 is converted into an analog Q phase component signal cosφ(t) by a D/A converter 19 and applied to one input of the multiplier 8 through the LPF 4'. The subsequent operation is the same as previously described in connection with FIG. 1 and the terminal 10 outputs the modulated signal expressed by equation (1).

There is a case where M-phase PSK (Phase Shift Keying) signal is generated by using such a quadrature modulator. FIG. 4 is a diagram schematically showing the principle of the generation of π/4 shift QPSK (Quadli Phase Shift Keying) signal, which signal is one example of such a M-phase PSK signal.

With reference to FIG. 4, it is assumed that a signal point corresponding to I phase component and Q phase component data of a baseband signal (modulating wave signal) at a certain time point exists at one of a, c, e and g on the unit circle having a radius of 1 shown in FIG. 4. At a subsequent time point after a lapse of a predetermined time slot, the signal point shifts to one of the intersections b, d, f and h between two virtual axis obtained by rotating the I axis and the Q axis by π/4 and the unit circle of a radius of 1. The I axis and the Q axis will be rotated by π/4 for each predetermined time slot in the same manner as described above, whereby the signal point sequentially shifts on the unit circle.

For example, if the signal point initially exists at the point a in FIG. 4 and the baseband signal does not change, the signal point shifts as a point→b point→c point→d point→e point→f point→g point→h point for every predetermined time slot, that is, at every π/4 rotation of the I axis and the Q axis. In this case, the I and Q phase data each takes the five types of values such as "1", "1/√2", "0", "−1/√2" and "−1" as can be seen from FIG. 4.

As described in the foregoing, in the modulation system in which each signal pattern of the I phase and the Q phase of a modulating wave signal has a plurality of levels, the use of a conventional quadrature modulator as shown in FIG. 3 employing ROM tables results in a drastic increase in the storage capacities of the ROMs 16 and 17, thereby increasing a manufacturing cost.

More specifically, where one ROM is provided for each of the I phase and the Q phase of the modulating wave signal as shown in FIG. 3, when each phase data has binary levels, one signal point, that is, one symbol requires one bit as an address of each ROM. When each phase data has five value levels, each symbol requires 3 bits as an address of each ROM. Furthermore, when each phase data has n-value levels, the number of bits of the address of each ROM required for each symbol is an integer equal to or more than $\log_2 n$. Therefore, with an increase in the number of levels of each phase data, the storage capacity of the ROM is increased in ogarithmic-functional manner.

In addition, when a single ROM is provided for each level of each data of the I phase and the Q phase to take a sum of the outputs of the respective ROM, each symbol requires one bit as an address of each ROM. When the number of levels of each data is n, the I phase and the Q phase require 2n number of ROMs in total.

As described in the foregoing, a quadrature modulator of a conventional structure used as a M phase PSK modulator such as a π/4 shift QPSK modulator requires a large capacity ROM or a large number of ROMs, which increases a manufacturing cost.

Such a conventional quadrature modulator as shown in FIG. 3 is structured such that the digital modulating wave component data (the outputs of the ROMs 16 and 17) are once converted into analog modulating wave component signals by the D/A converters 18 and 19, which are multiplied by carrier signals in an analog manner. Therefore, if the signal gains of the I phase component and the Q phase component of the modulating wave signal are different from each other in the stages subsequent to the LPFs 3' and 4' in FIG. 3, the spatial coordinates of the signal points are not located on the unit circle as in FIG. 2 and the signal locus becomes an ellipse. In such a case, the accurate modulating wave signal components can not be obtained and a satisfactory modulated signal can not be obtained accordingly.

Also in a case where the phases of two carrier components, which phases are shifted by π/2 from each other, are not precisely controlled, it is impossible to obtain a satisfactory modulated signal.

In addition, since numerous analog signal processing circuits are included in the prior art of FIG. 3, such circuit structure of the quadrature modulator as a whole can not be suitably made into an integration circuit.

SUMMARY OF THE INVENTION

Therefore, an object of the present invention is to provide a digital modulator capable of performing multi-phase PSK modulation without using a large capacity memory device or a large number of memory devices.

Another object of the present invention is to provide a digital modulator capable of obtaining a satisfactory modulated signal with ease.

A further object of the present invention is to provide a digital modulator structured by digital circuits and suitably made into an integration circuit.

In short, a digital modulator according to the present invention includes a source for supplying a digital baseband signal, a source for supplying digital carrier information, a baseband signal converting circuit, a phase information converting circuit, a plurality of storage devices, a digital addition circuit and a D/A converter. The baseband signal supply source supplies a digital baseband signal. The carrier information source supplies carrier signal information as digital data. The baseband signal converting circuit converts the baseband signal into a plurality of digital amplitude information in phases different from each other. The phase information converting circuit converts the carrier information into digital phase information of the same number as those of amplitude information and out of phase from each other by a predetermined phase amount. Each of the storage devices of the same number as those of the amplitude information and the phase information stores data indicative of a multiplication result of the corresponding amplitude information and the carrier signal, with the corresponding one of the plurality of amplitude information and the corresponding one of the plurality of phase information as addresses. The digital addition circuit adds in a digital manner the plurality of data read from the plurality of storage devices based on the plurality of amplitude information and the plurality of phase information. The D/A converter converts the output of the digital addition circuit into an analog modulated signal.

Therefore, since a baseband signal is converted into a plurality of digital amplitude information in phases different from each other and carrier phase information is converted into a plurality of digital phase information different from each other to calculate multiplication data of a carrier signal and amplitude information in the corresponding phase, with these plurality of amplitude information and phase information as addresses, the present invention have the principal advantage in enabling multi-phase PSK modulation without using a large capacity storage device or a large number of storage devices.

Since multiplication of each phase component of a baseband signal and a carrier signal is performed in a digital manner, the present invention has another advantage in obtaining an accurate modulated signal.

With the whole modulator structured by digital circuits, the present invention has a further advantage in making a modulator into an IC with ease.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram showing one example of a table stored in each storage device shown in FIG. 7.

FIGS. 9A and 9B are schematic diagrams illustrating effects of the embodiment shown in FIG. 7.

DESCRIPTION OF THE PREFERRED EMBODIMENTS

Figure 5:
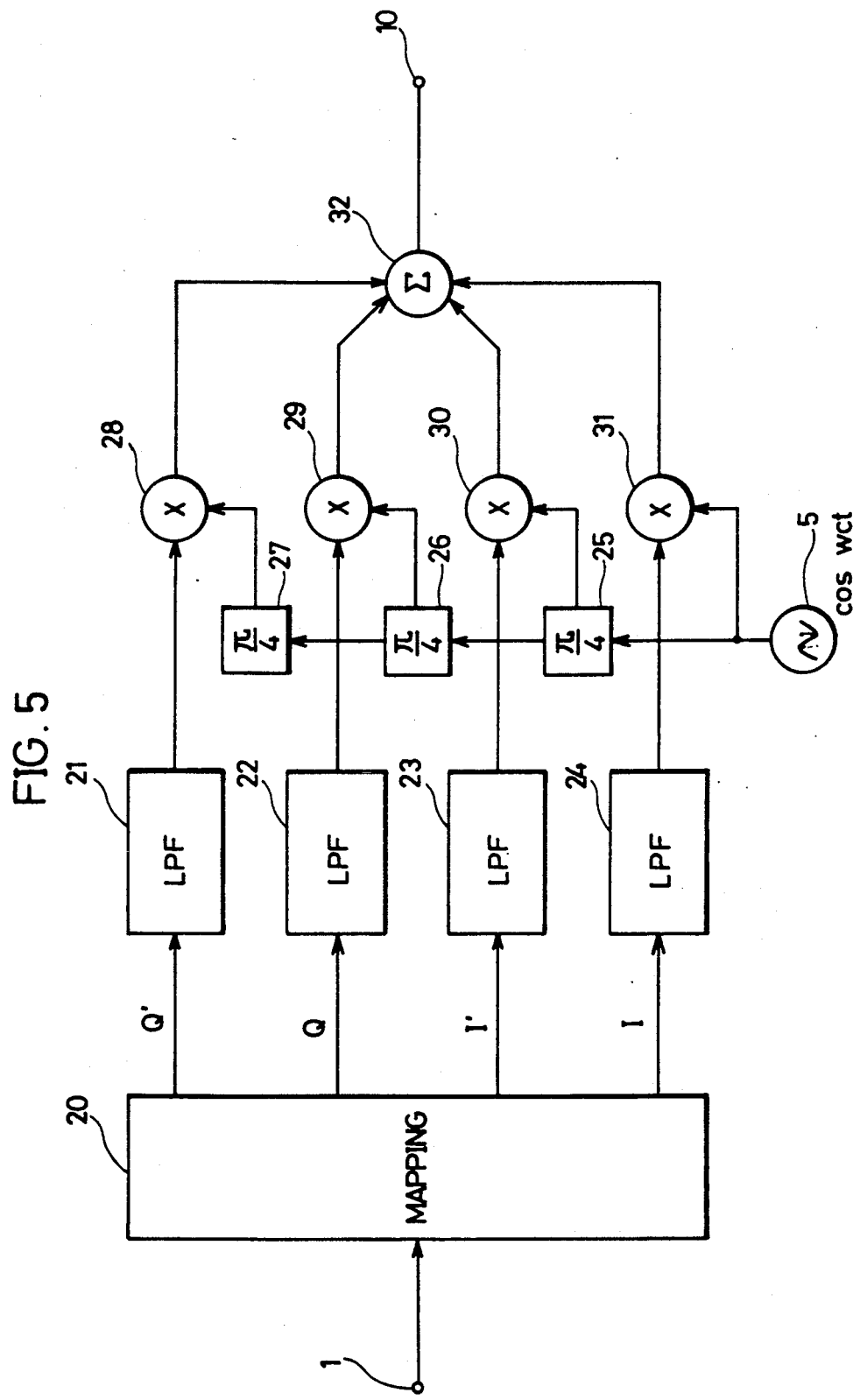
FIG. 5 is a block diagram schematically showing the basic principle of a $\pi/4$ shift QPSK modulator according to one embodiment of the present invention.
Figure 6:
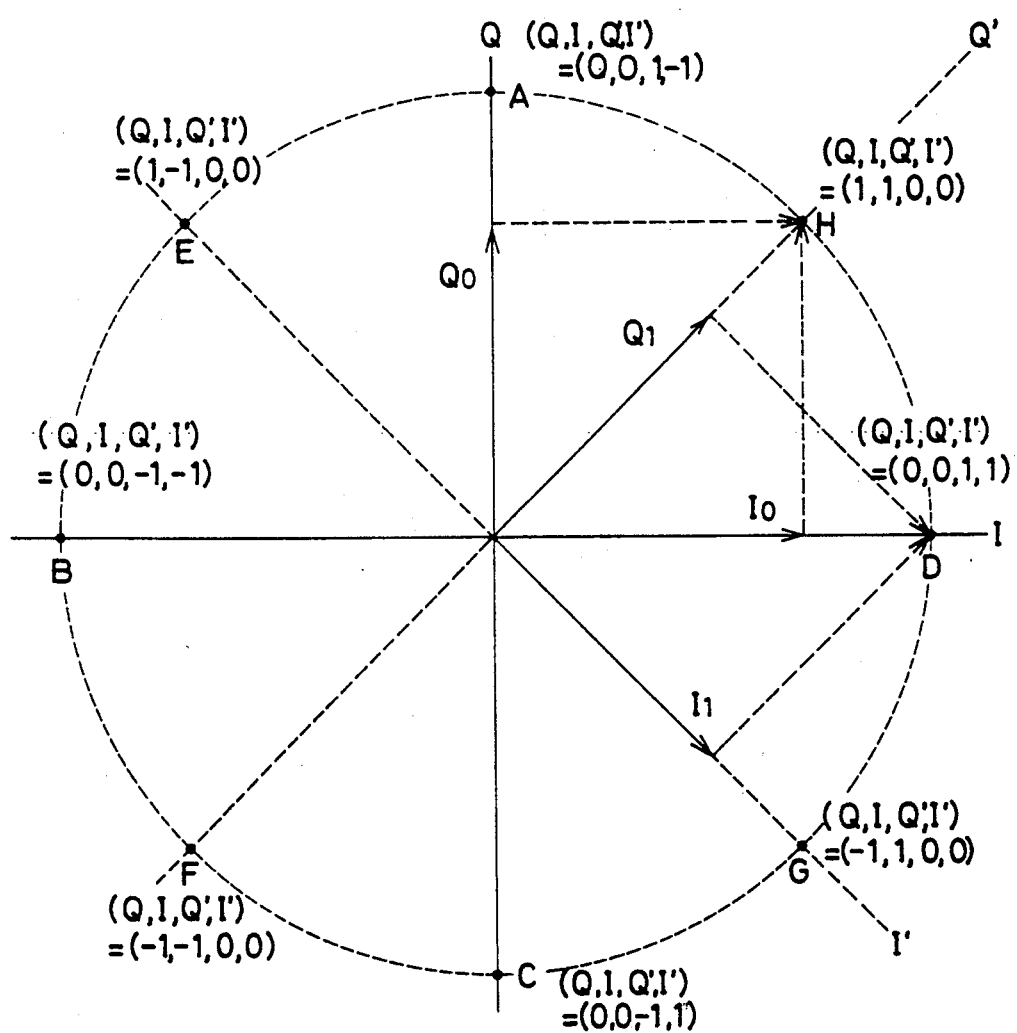
FIG. 6 is a spatial diagram schematically showing the basic principle of the $\pi/4$ shift QPSK modulator according to one embodiment of the present invention.

FIGS. 5 and 6 are a block diagram and a spatial diagram, respectively, schematically showing a basic principle of a $\pi/4$ shift QPSK modulator according to one embodiment of the present invention.

With reference to FIG. 5, a mapping circuit 20 outputs modulating wave signal components of four different phases in response to a digital baseband signal applied through an input terminal 1. These four phase components are applied to one inputs of the respective multipliers 28–31 through the corresponding LPFs 21–24, respectively.

The other inputs of the multipliers 28–31 receive four types of phase information signals obtained by shifting the phase of a carrier signal from a signal source 5 by $\pi/4$ by means of phase shift circuits 25–27. As a result, the multipliers 28–31 output the respective phase components of a modulated signal, which are added by an adder 32. Then, the output is provided through an output terminal 10 as a modulated signal.

An operation principle of the $\pi/4$ shift QPSK modulator of FIG. 5 will be more specifically described with reference to the spatial diagram of FIG. 6. In FIG. 6, signal points E, F, G and H are represented by the vectors ($I_0$, for example) on the I axis and the vectors ($Q_0$, for example) on the Q axis. Signal points A, B, C and D are represented by the vectors ($I_1$ and $Q_1$, for example) on the virtual $I'$ axis and $Q'$ axis which are obtained by shifting (rotating) the I axis and the Q axis by $\pi/4$. Therefore, when a presently supplied baseband signal corresponds to the signal point H, for example, the mapping circuit 20 outputs 1 and 1, for example, as I phase and the Q phase information, and 0 and 0, for, example, as $I'$ phase and the $Q'$ phase information. Then, when the signal point shifts to D as a result of the $\pi/4$ rotation of the I axis and the Q axis after a lapse of a predetermined time slot, the mapping circuit 20 outputs 0 and 0 as the I phase and the Q phase information and, 1 and 1 as the $I'$ phase and the $Q'$ phase information.

Figure 4:
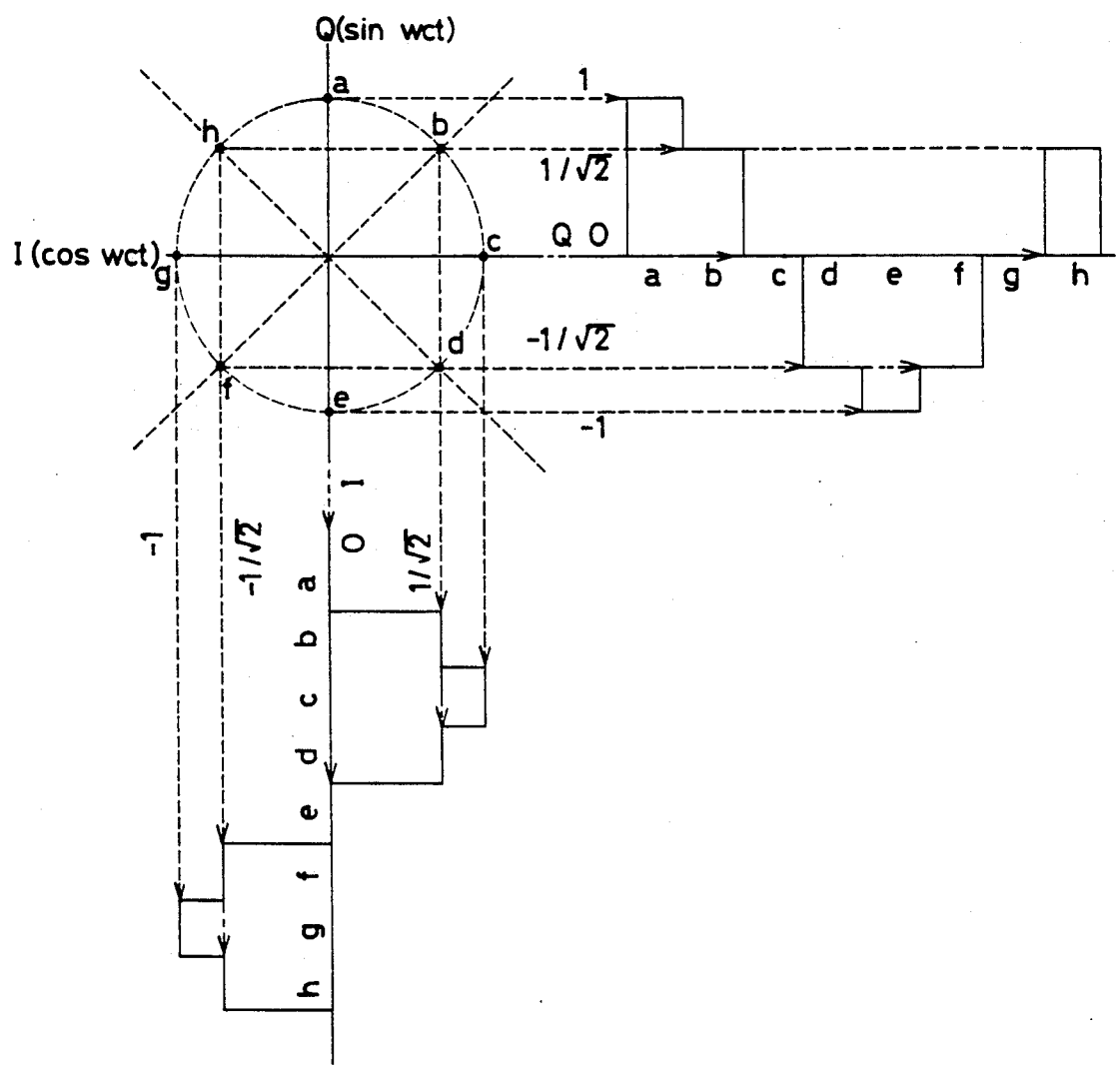
FIG. 4 is a diagram schematically illustrating the principle of a conventional $\pi/4$ shift QPSK modulator.

In other words, the mapping circuit 20 of FIG. 5 converts a modulated signal into four phase component signals of the I phase, the Q phase, $I'$ phase obtained by shifting the I phase by $\pi/4$ and the $Q'$ phase obtained by shifting the Q phase by $\pi/4$. According to such system, therefore, only 0 or $\pm 1$ should be allotted as a signal level with respect to the virtual axis shifted by $\pi/4$, so that it is not necessary for each data of the I phase and the Q phase to have five signal levels as in the prior art shown in FIG. 4.

Figure 7:
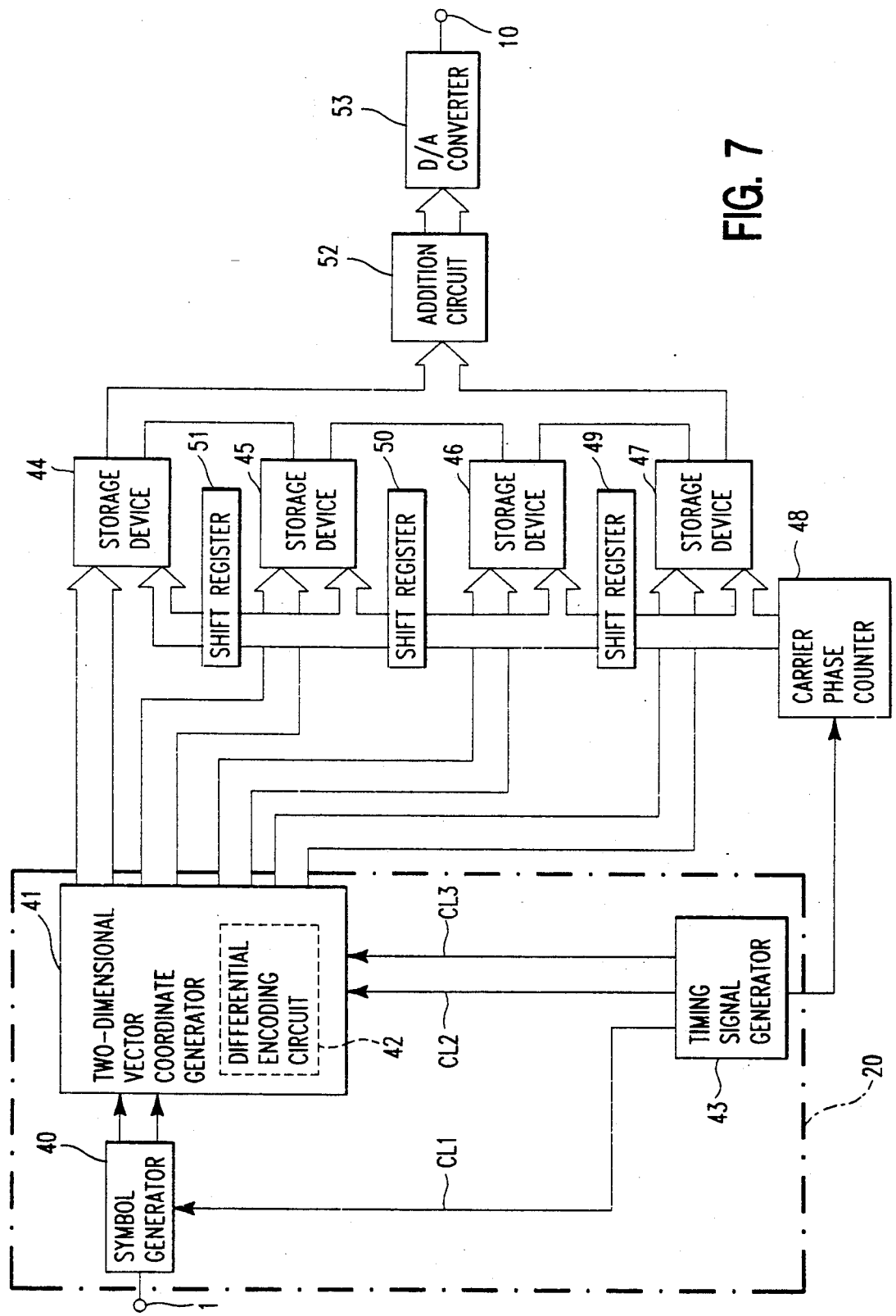
FIG. 7 is a block diagram showing a specific example of the $\pi/4$ shift QPSK modulator shown in FIG. 5.

FIG. 7 is a block diagram showing a specific example of the $\pi/4$ shift QPSK modulator shown in FIG. 5. In FIG. 7, a serial digital baseband signal applied through the input terminal 1 is converted into a 2-bit parallel signal by a symbol generator 40 including a serial-to-parallel converter and then applied to a two-dimensional vector coordinate generator 41. The two-dimensional vector coordinate generator 41 generates two two-dimensional vector coordinates based on two symbols of an even-numbered symbol and an odd-numbered symbol of the symbol data output from the symbol generator 40 or the differentially encoded symbol data in case where a differential encoding circuit 42 for differentially encoding serial symbol data is contained. A timing signal generating circuit 43 is driven by a clock signal having a frequency higher than a bit rate of the digital baseband signal to generate various clock signals CL1, CL2 and CL3.

That is, the clock signal CL1 having the same frequency as that of the bit rate of the baseband signal is applied to the symbol generator 40 which accepts a serial baseband signal based on the clock signal CL1 as described above. The clock signal CL2 having the same frequency as that of the symbol data output from the symbol generator 40 is applied to the two-dimensional victor coordinate generator 41 which accepts the symbol data based on the clock signal CL2 as described above to perform a differential encoding processing when necessary. Then, the clock signal CL3 having the same frequency as that of the two symbol data is also applied to the two-dimensional vector coordinate generator 41 which outputs four coordinate vector signals (corresponding to I, Q, I' and Q' of FIG. 5) which will be described later for each two-symbol period. These four coordinate vector signals are respectively applied to first to fourth storage devices (ROM) 44–47 as higher order addresses. The above-described symbol generator 40, two-dimensional vector coordinate generator 41 and timing signal generating circuit 43 are equivalent to the mapping circuit 20 shown in FIG. 5.

The four signals thus obtained from the mapping circuit 20 represent amplitude information of the input baseband signal (modulating wave signal) in the I phase, the Q phase, the I' phase and the Q' phase, which signals are respectively applied to the corresponding storage devices 44–47 as higher order addresses.

A carrier phase counter 48 is a counter which counts based on a clock signal supplied from the timing generating circuit 43 and having a frequency $2^n$ times that of a carrier signal, which counter is reset when the counted value reaches $2^n$ and outputs a signal indicative of phase information of the carrier signal. In other words, it is determined in advance that the output of the counter 48 indicates that the carrier phase is 0 when the counted value thereof is 0 and that the carrier phase is $2\pi$ when the counted value thereof is $2^n$.

Such output of the carrier phase counter 48 is supplied to the storage device 47 as a lower order address. The output also has its carrier phase shifted by $\pi/4$ by a shift register 49 and supplied to the storage device 46 as a lower order address. The output of the shift register 49 has its carrier phase further shifted by $\pi/4$ by a shift register 50 and supplied to the storage device 45 as a lower order address and its carrier phase further shifted by $\pi/4$ by a shift register 51 and supplied to the storage device 44 as a lower order address.

Each of the storage devices (ROM) 44–47 stores a table of such a structure as shown in FIG. 8. The example shown in FIG. 8 represents the storage data in a case where the above-described n is 3, that is, where the carrier phase counter 48 counts with the frequency 8 times that of the carrier signal.

More specifically, the left column of FIG. 8 shows digital data (A to H) each indicative of a baseband signal and supplied to each storage device as a higher order address. With each data having n bits, the baseband signal data takes $2^n$ values. The central column of FIG. 8 shows the outputs of the counter 48 each indicative of a carrier phase and supplied to each storage device as a lower order address. The right column of FIG. 8 shows the storage contents each including a multiplication result of an amplitude of a carrier in each carrier phase and a baseband signal.

The storage device 44 therefore outputs data obtained by multiplying the I' phase component digital data of the baseband signal by the amplitude of the carrier at the corresponding carrier phase based on an address designated by the I' phase component digital data (higher order address) of the baseband signal applied from the two-dimensional vector coordinate generator 41 and the carrier phase (lower order address) shifted by $3\pi/4$ by means of the shift registers 49–51.

The storage device 45 outputs data obtained by multiplying the I phase component digital data of the baseband signal by the amplitude of the carrier at the corresponding carrier phase based on an address designated by the I phase component digital data (higher order address) of the baseband signal supplied from the two-dimensional vector coordinate generator 41 and the carrier phase (lower order address) shifted by $\pi/2$ by means of the shift registers 49 and 50.

The storage device 46 outputs data obtained by multiplying the Q' phase component digital data of the baseband signal by the amplitude of the carrier at the corresponding carrier phase based on an address designated by the Q' phase component digital data (higher order address) of the baseband signal supplied from the two-dimensional vector coordinate generator 41 and the carrier phase (lower order address) shifted by $\pi/4$ by means of the shift register 49.

Lastly, the storage device 47 outputs data obtained by multiplying the Q phase component digital data of the baseband signal by the amplitude of the carrier at the corresponding carrier phase based on an address designated by the Q phase component digital data (higher order address) of the baseband signal supplied from the two-dimensional vector coordinate generator 41 and the carrier phase (lower order address) that the output of the carrier phase counter 48 indicates.

The data output from these storage devices 44–47 are applied to a digital addition circuit 52 which adds these data in a digital manner to output digital data indicative of a modulated signal. The digital data is converted into an analog modulated signal by an D/A converter 53 and output through the terminal 10.

It is assumed herein that the baseband signal presently being supplied is information indicative of the signal point A of FIG. 6 and the carrier that the output of the carrier phase counter 48 indicates is $7\pi/4$. Then, the two-dimensional vector coordinate generator 41 outputs the vector $-I_1 [K \cdot \cos(\pi/4 + \pi)]$ as information of the I phase, the vector $Q1 [K \cdot \sin \pi/4]$ as information of the Q phase and 0 as information of the I' phase and the Q' phase. Herein, K is assumed to be a predetermined coefficient.

In this case, since the I' phase information (that is, 0) as a higher order address and the phase information (that is, the information indicative of $\pi$) obtained by delaying the carrier phase $7\pi/4$ by $3\pi/4$ by means of the shift registers 49–51 as a lower order address are applied to the storage device 44, the device outputs data 0.

Since the I phase information (that is, the magnitude of the vector $-I_1$) as a higher order address and the phase information (that is, information indicative of $5\pi/4$) obtained by delaying the carrier phase $7\pi/4$ by $\pi/2$ by means of the shift registers 49 and 50 as a lower order address are applied to the storage device 45, the device outputs data $-I_1 \cdot \sin 5\pi/4$.

Since the Q' phase information (that is, 0) as a higher order address and the phase information (that is, information indicative of $3\pi/2$) obtained by delaying the carrier phase $7\pi/4$ by $\pi/4$ by means of the shift register 49 as a lower order address are applied to the storage device 46, the device outputs data 0.

Since the Q phase information (that is, the magnitude of the vector $Q_1$) as a higher order address and the carrier phase $7\pi/4$ as a lower order address are applied to the storage device 47, the device outputs data $Q_1 \cdot \sin 7\pi/4$.

The output of the digital addition circuit 52 therefore becomes digital data equivalent to $Q_1 \cdot \sin 7\pi/4 -$ $I_1 \cdot \sin 5\pi/4$, which data is converted into an analog signal by the D/A converter 53 to obtain instantaneous amplitude data of a modulated signal based on the above-described phase relationship. In other words, a desired modulated signal can be obtained by obtaining multiplication data in respective carrier phases in time sequence as described above and sequentially converting the data into an analog signal.

FIGS. 9A and 9B are schematic diagrams illustrating the effects of the embodiment of the present invention shown in FIGS. 5 and 7 in comparison with the prior art. More specifically, in a conventional $\pi/4$ shift QPSK modulator, both of symbol data including two-bit baseband signal data $D_0$ and $D_1$ and symbol data including $D_2$ and $D_3$ obtain as a result of the $\pi/4$ rotation of the I axis and the Q axis are represented as an I phase component and a Q phase component on the two-dimensional coordinate defined by the I axis and the Q axis as shown in FIG. 9A. Each component data therefore has five types of level values as described above, thereby drastically increasing the storage capacity of a ROM required for each of the I phase and the Q phase.

On the other hand, in the $\pi/4$ shift QPSK modulator according to the present invention, the symbol data including 2-bit baseband signal data $D_0$ and $D_1$ are represented as the I phase component and the Q phase component on the two-dimensional coordinate defined by the I axis and the Q axis and the symbol data including $D_2$ and $D_3$ obtained as a result of the $\pi/4$ rotation of the I axis and the Q axis are represented as the I' phase component and the Q' phase component on the two-dimensional coordinate rotated by $\pi/4$ as shown in FIG. 9B. Each component data therefore has only three types of level values as described above to prevent an increase of the storage capacity of a ROM.

Figure 10:
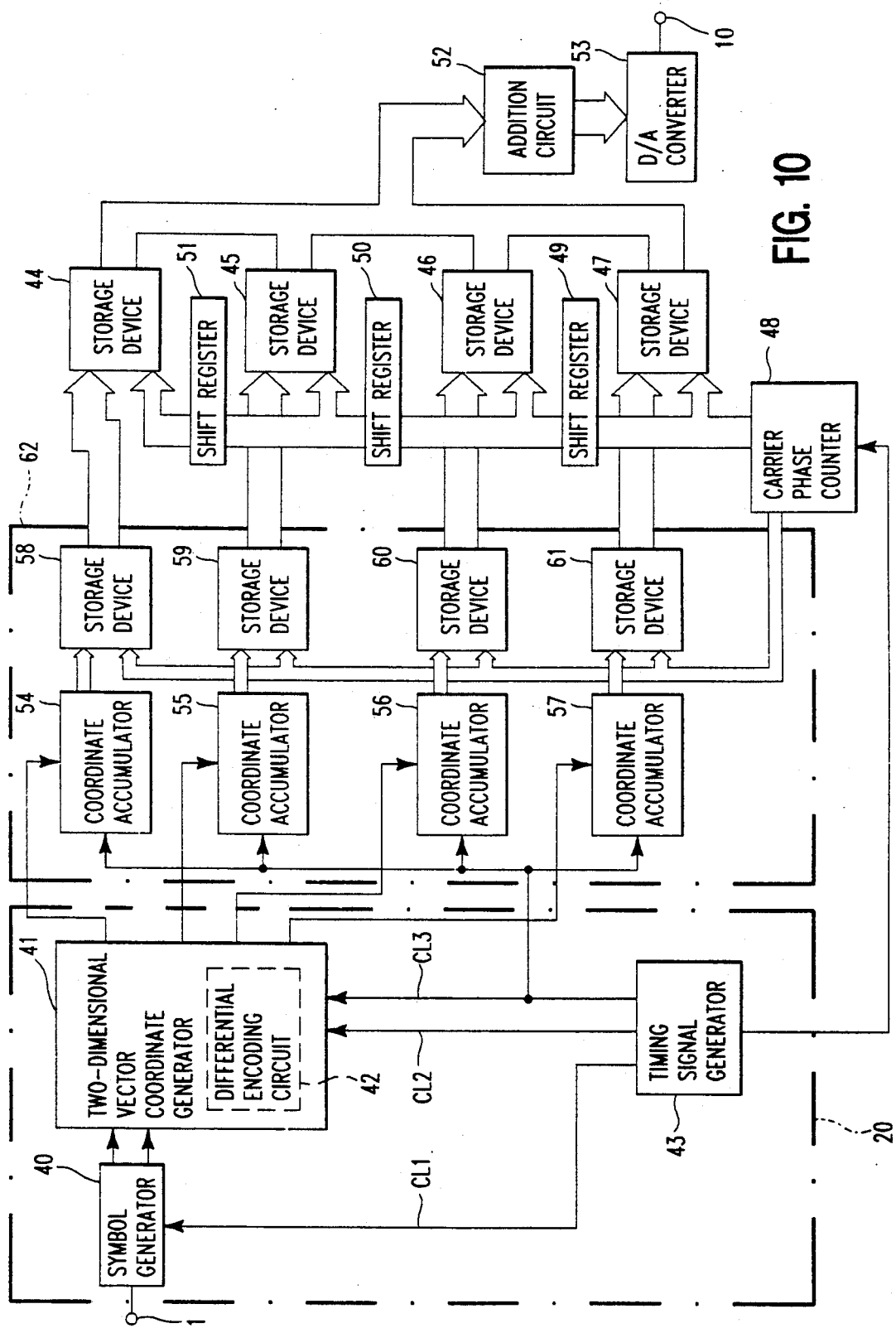
FIG. 10 is a schematic block diagram showing a $\pi/4$ shift QPSK modulator according to a second embodiment of the present invention.

FIG. 10 is a block diagram showing a $\pi/4$ shift QPSK modulator according to a second embodiment of the present invention. The embodiment shown in FIG. 10 is the same as that shown in FIG. 7 except for the following points. That is, a digital filter circuit 62 is provided between the mapping circuit 20 and the storage devices 44-47, thereby enabling narrow-band transmission of coordinate vector signals.

More specifically, the digital filter circuit 62 comprises coordinate accumulators 54-57 for accumulating four coordinate signals I, I', Q and Q' for several symbol periods and storage devices 58-61 for outputting a coordinate signals with bandwidth limited based on the outputs of these coordinate accumulators and the time passage information from the timing signal generating circuit 43. In the digital filter circuit 62, the coordinate accumulators 54 and 55 sequentially serial-to-parallel converts a 2-bit signal of odd-numbered symbol on the vector coordinate, out of the outputs of the mapping circuit 20, for every two-symbol period. The coordinate accumulators 56 and 57 sequentially serial-to-parallel converts 2-bit signal of odd-numbered symbol on the vector coordinate, out of the outputs of the mapping circuit 20, for every two-symbol period.

The storage device 58 receives the output of the coordinate accumulator 54 and the time passage information from the carrier phase counter 48 as addresses to output $\pm 1$ corresponding to the output of the coordinate accumulator 54 during the odd-numbered symbol period and outputs a filter response waveform formed on the assumption of 0 input during the even-numbered symbol period, based on the previously stored contents.

The storage device 59 receives the output of the coordinate accumulator 55 and time passage information from the carrier phase counter 48 as addresses to output $\pm 1$ corresponding to the output of the coordinate accumulator 55 during the odd-numbered symbol period and outputs a filter response waveform formed on the assumption of 0 input during the even-numbered symbol period, based on the previously stored contents. The storage device 60 receives the output of the coordinate accumulator 56 and the time passage information from the carrier phase counter 48 as addresses to output $\pm 1$ corresponding to the output of the coordinate accumulator 56 during the even-numbered symbol period and outputs a filter response waveform formed on the assumption of 0 input during the odd-numbered symbol period, based on the previously stored contents. The storage device 61 receives the output of the coordinate accumulator 57 and the time passage information from the carrier phase counter 48 as addresses to output $\pm 1$ corresponding to the output of the coordinate accumulator 57 during the even-numbered symbol period and outputs a filter response waveform formed on the assumption of 0 input during the odd-numbered symbol period, based on the previously stored contents. As a result, a bandwidth of each phase component is limited.

Figure 11A:
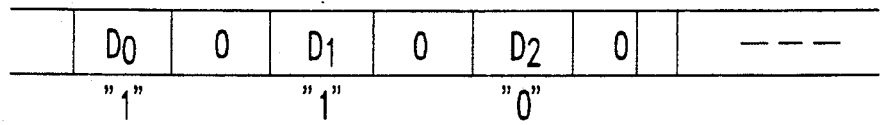
FIGS. 11a–d are diagrams illustrating an operation of the second embodiment shown in FIG. 10 and specifically show an ordering of data over two symbol periods, a waveform of this data, an enlarged waveform of this data, and addressing of data stored in a ROM, respectively.
Figure 11B:
Figure 11C:
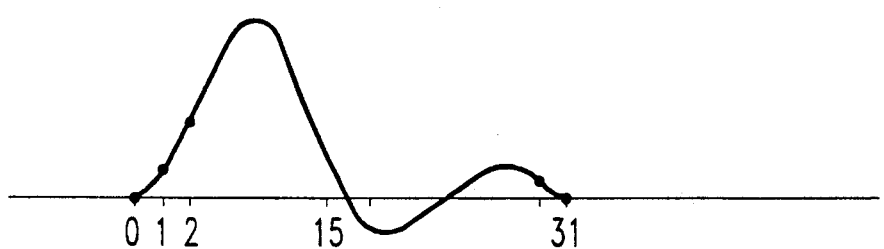

That is, since data is always followed by 0 when data and 0 are alternately arranged as in each of the I, I', Q and Q' phase components of FIG. 9B (see FIG. 11a), a data waveform including data and 0 as one set and extending over two symbol periods as shown in FIG. 11b (FIG. 11c is an enlarged diagram thereof) is stored in the ROM so as to correspond to the data in advance, so that a filter output corresponding the data and the subsequent 0 can be supplied from a small capacity ROM by supplying the data of each phase component to the ROM.

Since a value during one symbol period of two-symbol periods always takes 0 and a value during the other symbol period takes either 1 or $-1$, there are two kinds of combinations (1, 0) and $(-1, 0)$ as combinations of two symbols. Therefore, two symbol periods can be expressed by two levels (one bit) by newly allocating "1" and "0" to the combination (1, 0) and $(-1, 0)$ of two symbol periods, respectively.

Figure 11D:
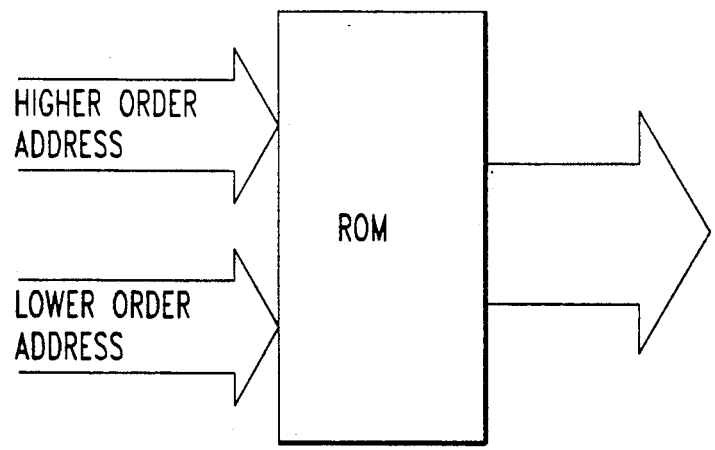

In comparison with the conventional example, wherein one symbol period is expressed by five levels, (1) a higher order address of the ROM shown in FIG. 11d is reduced to a half by allocating a coordinate every two symbol periods as compared with the conventional example wherein a coordinate is allocated every one symbol period and (2) an address of the above described ROM is reduced by the number of the accumulated data multiplied by (3-1) by expressing a coordinate with two levels (one bit) as compared with the conventional example wherein a coordinate is expressed five levels (three bits). The storage capacity of the ROM can be remarkably reduced by the multiplier effect of the above described (1) and (2). On the other hand, the ROM of FIG. 11d requires only one bit to be added to the lower order address of the prior art to cover two symbol periods (the counted number 32), thereby supplying a signal waveform corresponding to two symbol periods of one data from each storage device of the digital filter.

Figure 12:
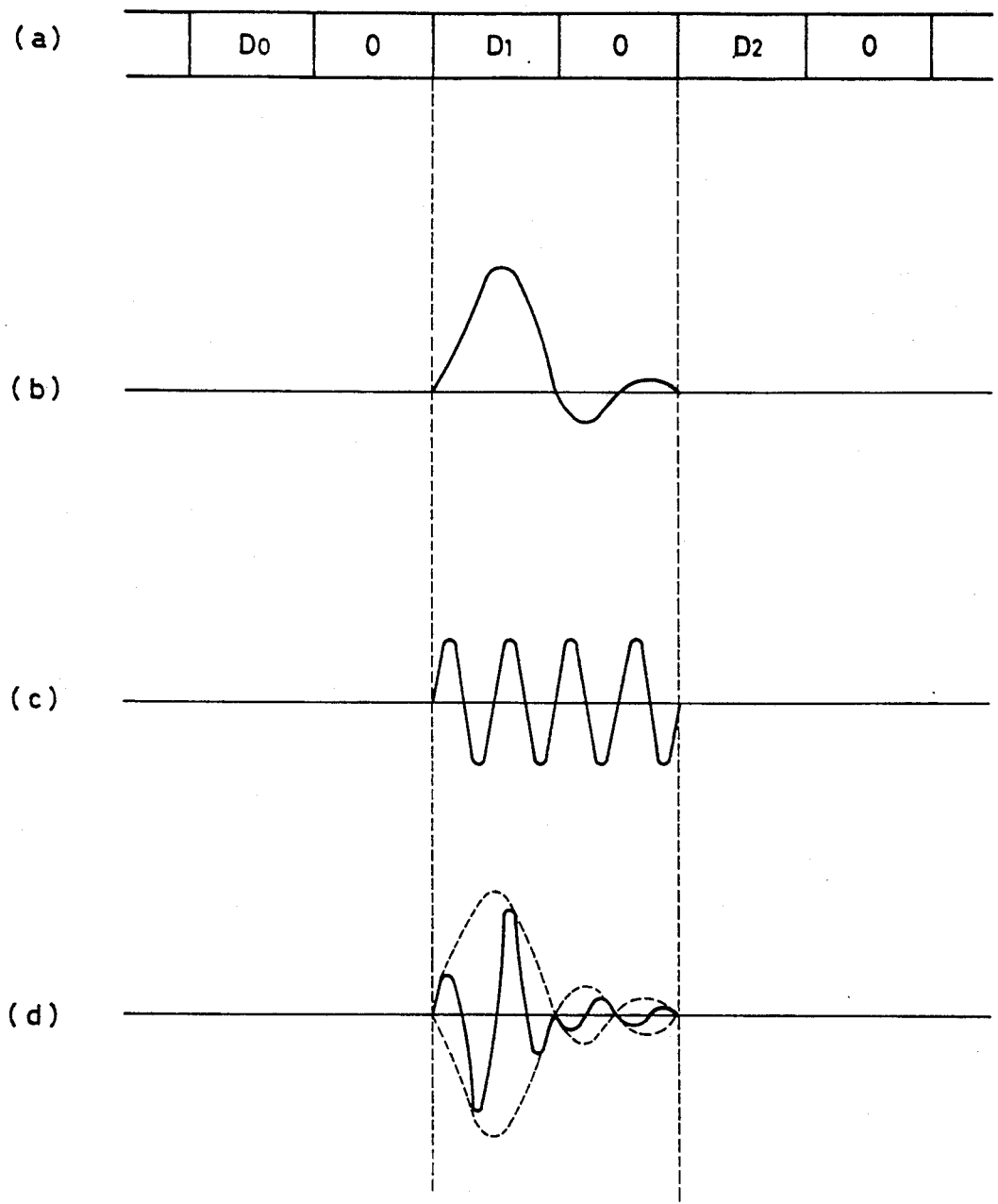
FIGS. 12a–d are waveform diagrams illustrating an operation of a modification of the second embodiment.

When the contents of each storage device is replaced by a multiplication result of a signal having its bandwidth limited and a carrier signal as shown in FIG. 12, each storage device having such multiplication result as its storage contents is equivalent to a storage device formed by integrating the corresponding one of the storage devices 58-61 and the corresponding one of the storage devices 44-47.

In addition, if the storage devices 44-47 in FIG. 7 are replaced by such storage devices as described above, the same effect as that of the second embodiment can be obtained in the first embodiment shown in FIG. 11 without adding a digital filter circuit.

Figure 13:
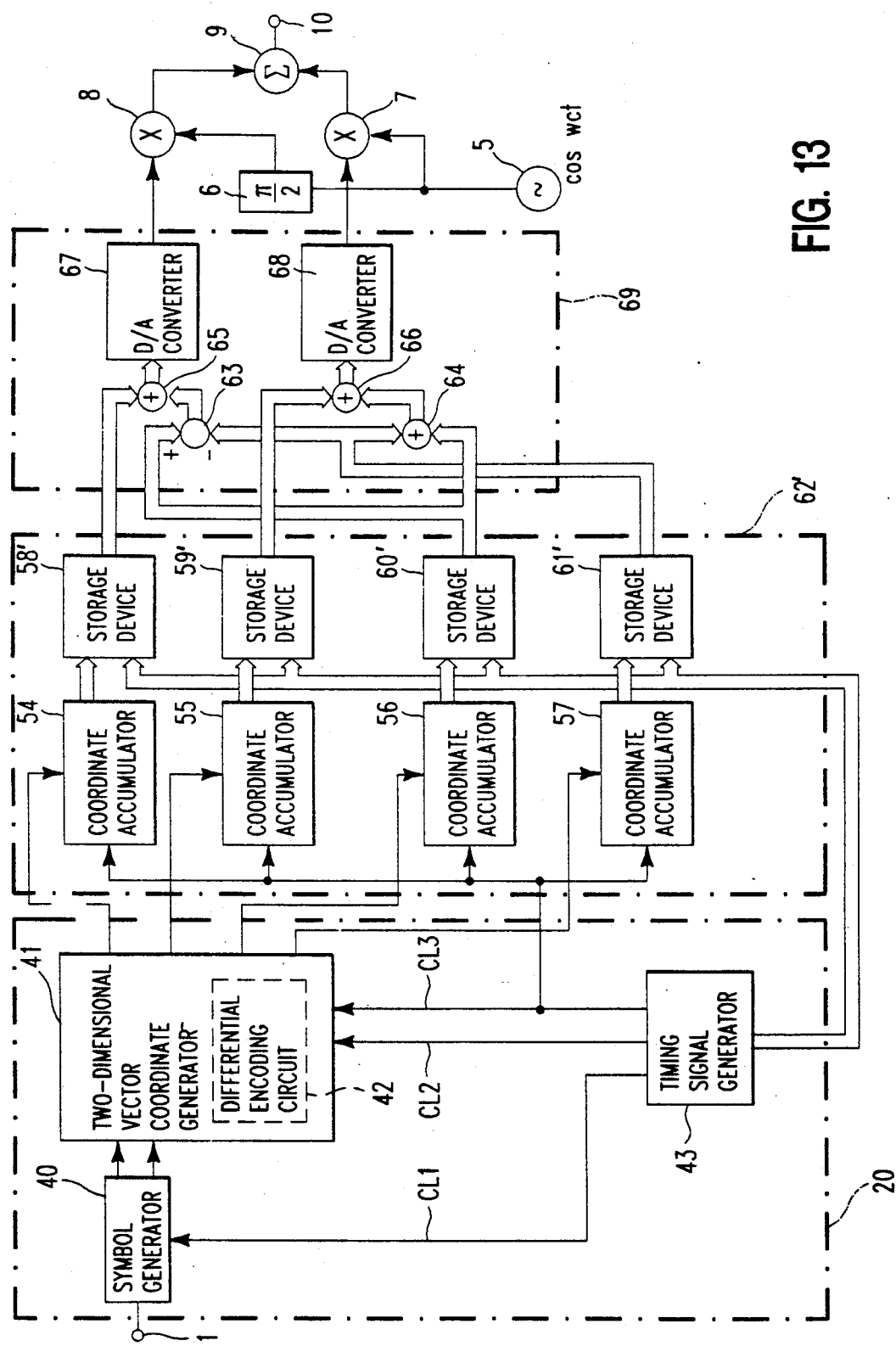
FIG. 13 is a block diagram showing a $\pi/4$ shift QPSK modulator according to a third embodiment of the present invention.

FIG. 13 is a schematic block diagram showing a $\pi/4$ shift QPSK modulator according to a third embodiment of the present invention.

The embodiment shown in FIG. 13 indicates the case wherein the modulating portion is formed in an analog manner.

In the circuit of this embodiment, each of the storage devices 60' and 61' constituting the digital filter circuit 62' stores ±1 corresponding to the output of the coordinate accumulator at the even-numbered symbol timing and $1/\sqrt{2}$ level of the filter response waveform on the assumption of 0 input at the odd-numbered symbol timing. Out of the outputs of a digital filter circuit 62', the output of a storage device 61' is subtracted from the output of a storage device 60' by a subtractor 63 and the result is added to the output of a storage device 58' by an adder 65. The outputs of the storage devices 60' and 61' are added to each other by an adder 66. The output of the adder 65 is converted into an analog baseband signal through a D/A converter 67, while the output of the adder 66 is converted into an analog baseband signal through a D/A converter 68. The subtractor 63, adders 64, 65 and 66 and the D/A converters 67 and 68 constitute an arithmetic circuit 69. In other words, this arithmetic circuit 69 performs operations for converting the baseband signal generated in respective phases of I, I', Q and Q' into the baseband signal of two phases of I and Q for the quadrature modulator. An analog quadrature modulator in a subsequent stage of the arithmetic circuit 69 is the same as the conventional quadrature modulator described in connection with FIG. 1, description of which will be omitted.

According to the embodiment shown in FIG. 13, symbol data is generated based on an input digital baseband signal and a two-dimensional vector coordinate is calculated for each of even-numbered and odd-numbered symbols based on the symbol data to perform operations on a response waveform obtained based on these vector coordinates, thereby once generating digital baseband signals of four phases. Then, the digital baseband signals are converted into analog baseband signals of two phases, which are further quadrature-modulated by a conventional analog quadrature modulator based on the analog baseband signal of two phases. In other words, the mapping circuit 20, the digital filter circuit 62' and the arithmetic circuit 69 shown in FIG. 13 constitute a baseband signal generator for a $\pi/4$ shift QPSK modulator using a quadrature modulator.

In the embodiment shown in FIG. 13, the process of generating baseband signals of four phases which are outputs of the digital filter circuit 62' based on the digital baseband signal serially applied through the input terminal 1 is exactly the same as that of the second embodiment shown in FIG. 10 except that only data stored in each of the storage device 60, and 61, is $1/\sqrt{2}$ times as large as the data in the second embodiment shown in FIG. 10. Accordingly, the generating process in these portions are omitted.

Then, the relation between the baseband signals of four phases and the baseband signals of two phases will be described, together with conversion from four phases to two phases of the baseband signal by the arithmetic circuit 69. In the following, it should be noted that the four phase baseband signals correspond to the outputs of the storage devices 58 to 61 shown in FIG. 10, which further correspond to the outputs of the LPFs 21 to 24 shown in the block diagram of FIG. 5. On the other hand, it should be noted that the two phase baseband signals correspond to the outputs of the LPFs 3 and 4 shown in the block diagram of FIG. 1, that is, the signals to the applied to the quadrature modulator.

When the outputs of the LPFs 21 to 24 are represented by $Q_\beta$, $Q_\alpha$, $I_\beta$, $I_\alpha$, respectively, the modulating wave signal can be represented as follows:

$$S(t) = I_\alpha \cos wt + I_\beta \cos (wt + \pi/4) + Q_\alpha \sin wt + Q_\beta \sin (wt + \pi/4) \quad (2)$$

Figure 14:
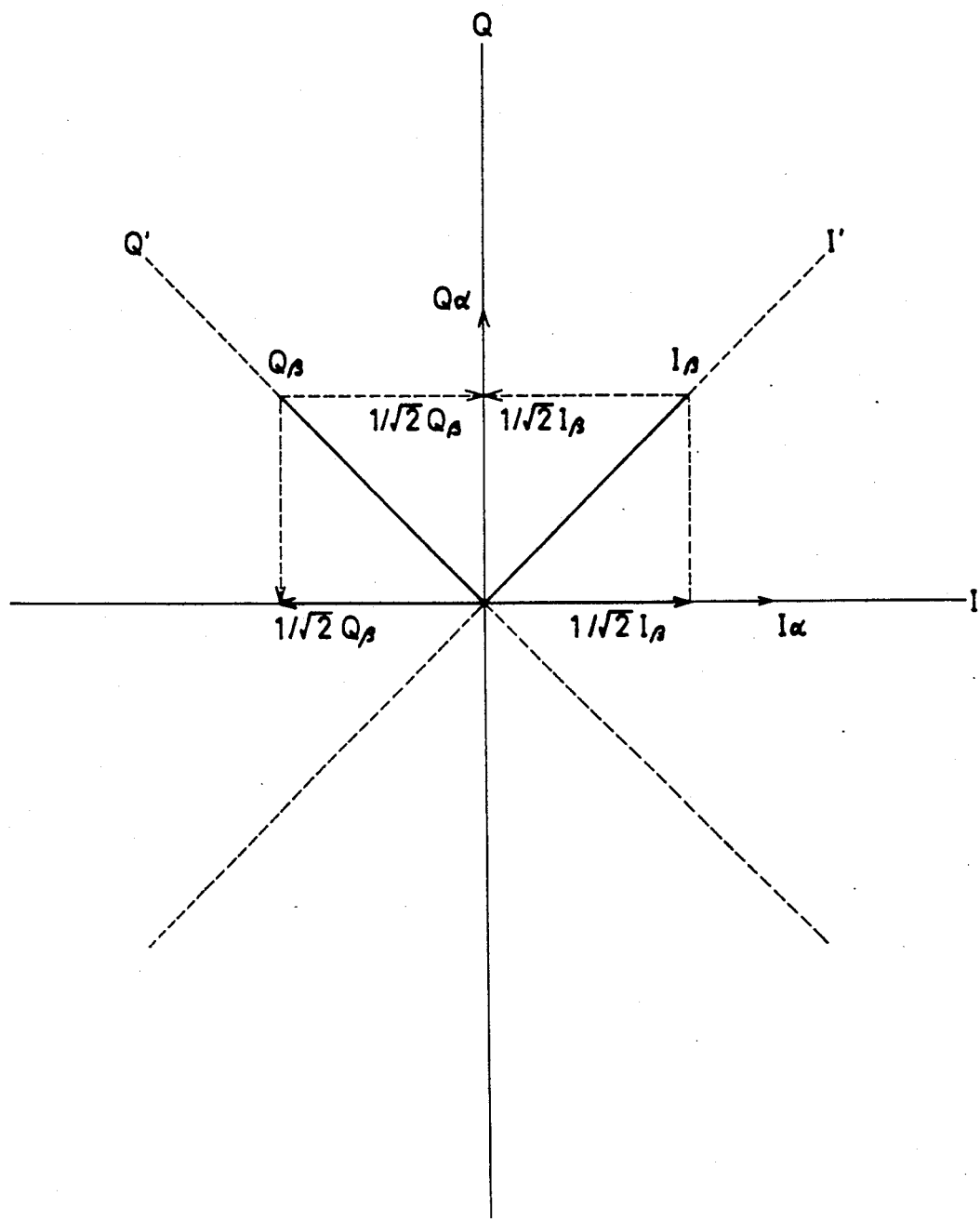
FIG. 14 is a graph illustrating an operation of the embodiment shown in FIG. 13.

As a result, the spatial diagram as shown in FIG. 14 can be obtained.

Figure 1:
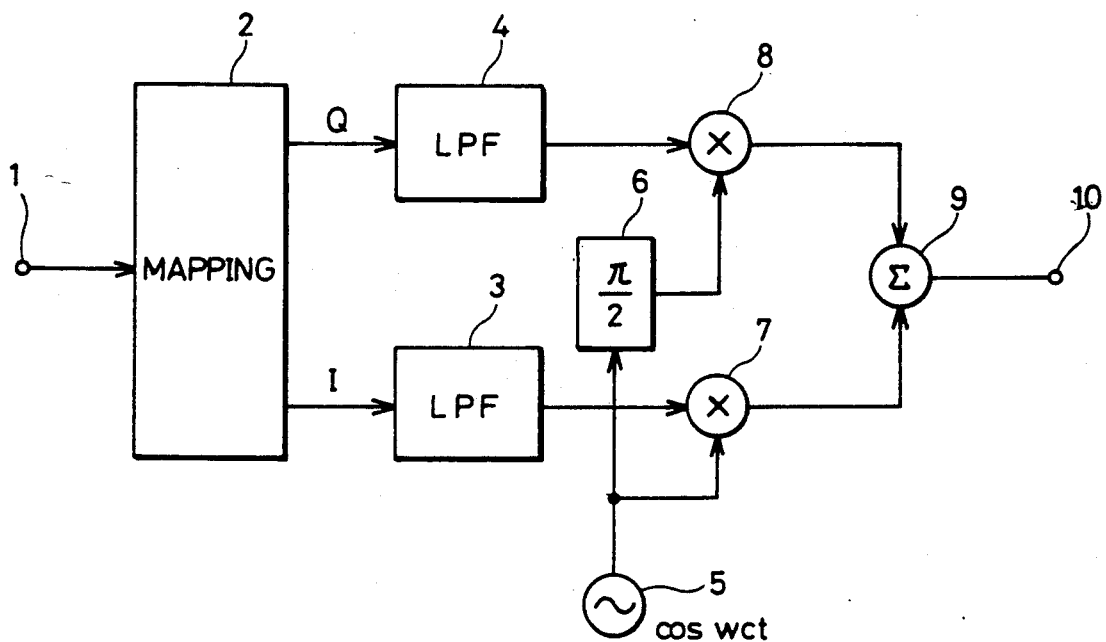
FIG. 1 is a block diagram schematically showing the principle of a quadrature modulator.
Figure 2:
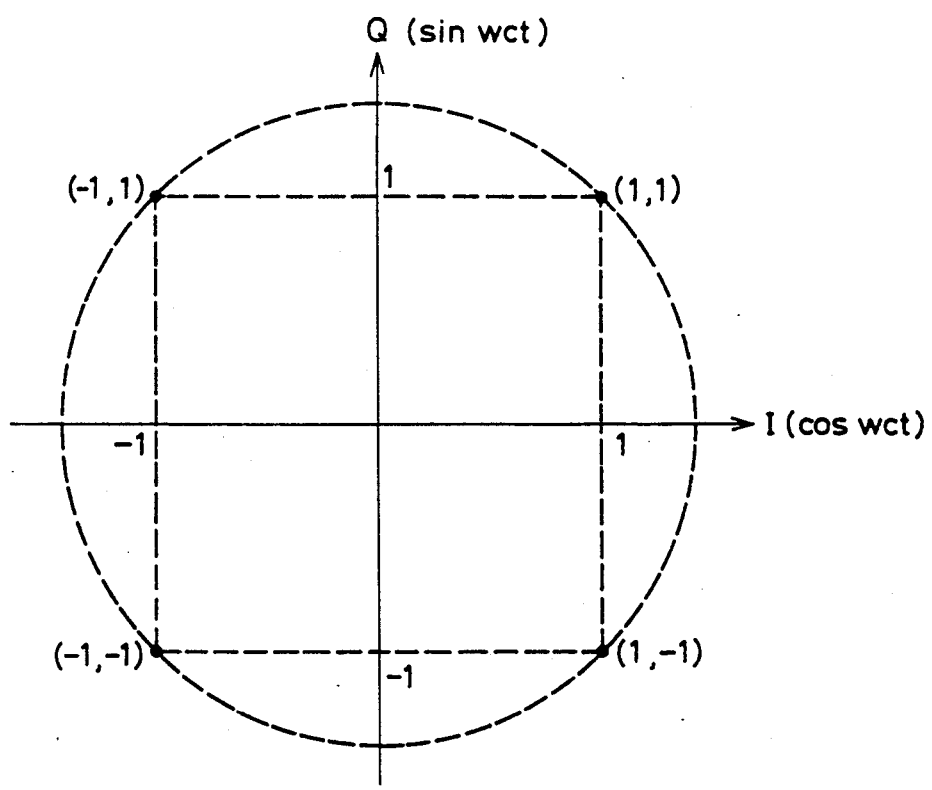
FIG. 2 is a spatial diagram schematically showing the principle of the quadrature modulator.
Figure 3:
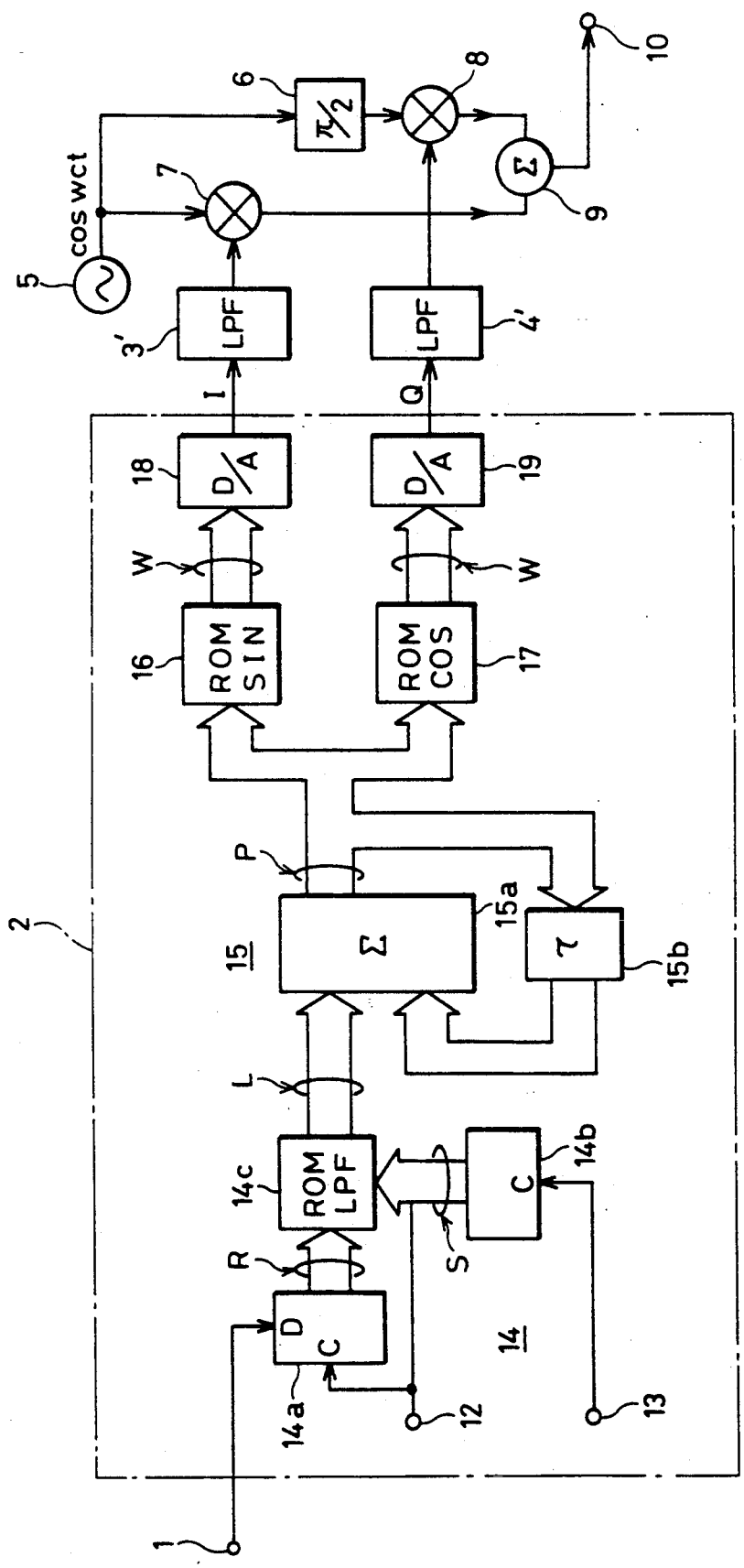
FIG. 3 is a block diagram showing a conventional GMSK modulator.

On the other hand, when the outputs of the LPFs 3 and 4 shown in FIG. 1 are represented by I and Q, respectively, the modulating wave signal S (t) can be represented as follows:

$$S(t) = I \cos wt + Q \sin wt \quad (3)$$

Then, the equation (2) is modified as follows:

$$\begin{aligned} S(t) &= I_\alpha \cos wt + I_\beta/\sqrt{2} \, (\cos wt + \sin wt) + \\ &\quad Q_\alpha \sin wt + Q_\beta/\sqrt{2} \, (\sin wt - \cos wt) \\ &= (I_\alpha + I_\beta/\sqrt{2} - Q_\beta/\sqrt{2}) \cos wt + \\ &\quad (Q_\alpha + I_\beta/\sqrt{2} + Q_\beta/\sqrt{2}) \sin wt \end{aligned} \quad (4)$$

The terms $I_\beta/\sqrt{2}$ and $-Q_\beta/\sqrt{2}$ in this equation (4) are the mapping of $I_\beta$ and $Q_\beta$ on the I axis in FIG. 14. Similarly, the terms $I_\beta/\sqrt{2}$ and $Q_\beta/\sqrt{2}$ are the mapping of $I_\beta$ and $Q_\beta$ on the Q axis. Then, from the equations (2) and (4), I and Q can be obtained as follows:

$$\begin{aligned} I &= I_\alpha + I_\beta/\sqrt{2} - Q_\beta/\sqrt{2} \\ Q &= Q_\alpha + I_\beta/\sqrt{2} + Q_\beta/\sqrt{2} \end{aligned} \quad (5)$$

Accordingly, two phase baseband signals can be generated from the four phase baseband signals by performing the operations of the equation (5), which operations can be realized by the arithmetic circuit 69.

More specifically, $I_\beta$ and $Q_\beta$ are always added and subtracted after being multiplied by $1/\sqrt{2}$ in the equation (5), the values $1/\sqrt{2}$ times as large as $I_\beta$ and $Q_\beta$ are stored in advance in the storage devices 60' and 61' in FIG. 13, respectively. As a result, the equation (4) can be realized by using only adders and subtractors. Accordingly, addition and subtraction included in the equations (4) are performed by the subtractor 63 and the adders 64, 65 and 66 to generate digital values of the I phase and Q phase components. Then, the I phase and the Q phase signals are converted into analog signals by the D/A converters 67 and 68, respectively, and supplied to the analog quadrature modulator.

Figure 15:
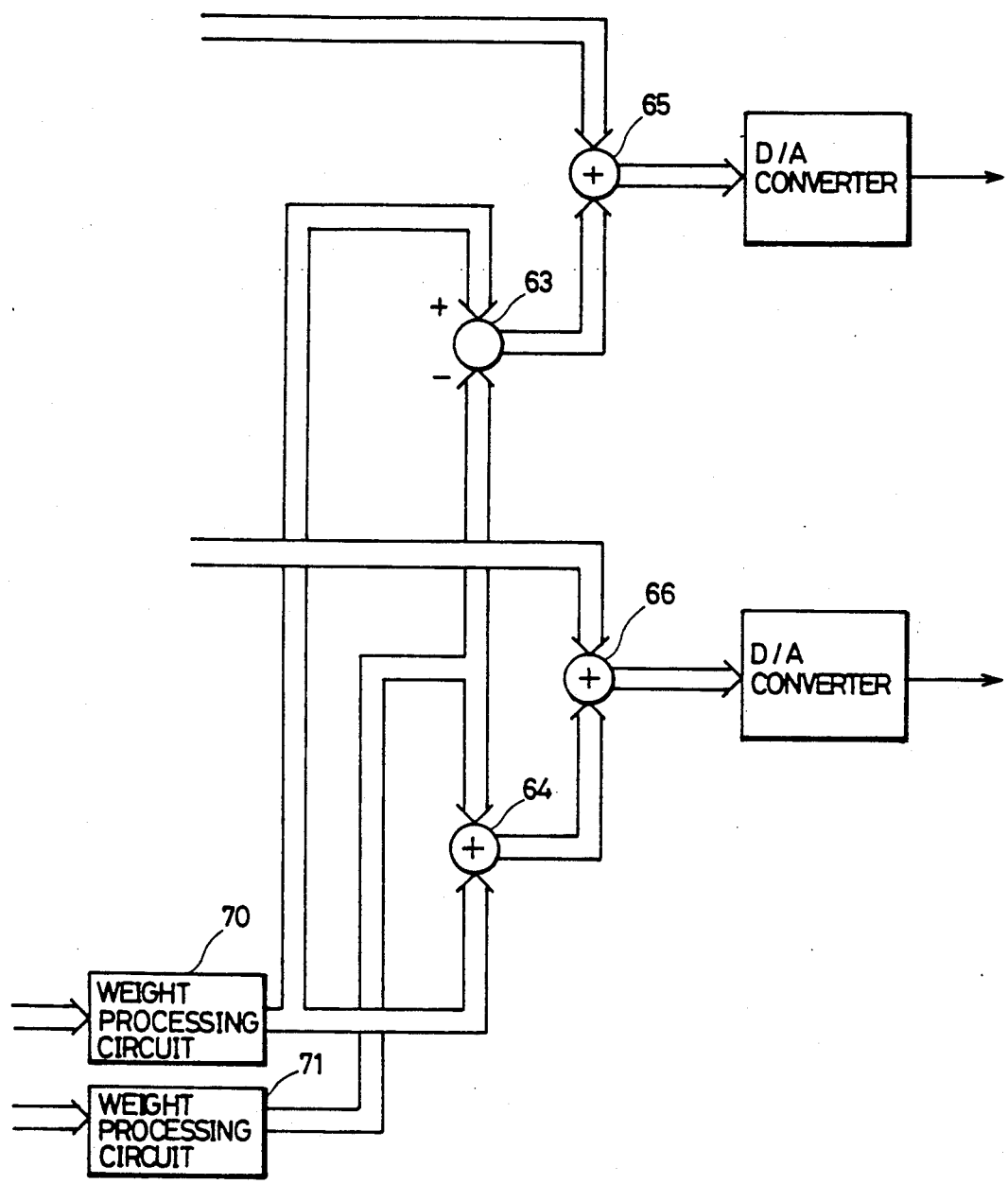
FIG. 15 is a block diagram showing a modified example of an arithmetic circuit according to the embodiment shown in FIG. 13.

FIG. 15 is a block diagram showing a modified example of the arithmetic circuit 69 according to the embodiment shown in FIG. 13. In the example of FIG. 15, the outputs of the storage devices 60 and 61 are weighted by weight processing circuits 70 and 71, respectively, to obtain weighted response waveforms. In this case, the response waveforms stored in the storage devices 60' and 61' require no weighing.

More specifically, the weighing of the digital data corresponding to the coefficients in the equation (5) are performed by the weight processing circuit 70 and 71, so that the outputs corresponding to the equation (4) can be provided from the adders 65 and 66.

As described in the foregoing, according to the embodiment shown in FIGS. 13 and 15, bandwidth-limited I phase signal and Q phase signal of a baseband signal for a $\pi/4$ shift QPSK modulator can be obtained as analog signals without increasing a storage capacity of a storage device, thereby constituting a $\pi/4$ shift QPSK modulator.

According to the embodiments shown in FIGS. 7 and 10, the storage device 44 to 47 are adapted to have the same storage contents and carrier information supplied from the carrier phase counter 48 is shifted by the shift registers 49 to 51. However, the same effects can be obtained if the storage devices are adapted to be provided with the same carrier information and have different data with respect to the same address.

While each of the foregoing embodiments is described as an application of the present invention to a $\pi/4$ shift QPSK modulator, the application of the present invention is not limited to a $\pi/4$ shift QPSK modulator but it is also applicable to a multi-phase PSK modulator.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital modulator comprising:
   means for supplying a digital baseband signal,
   means for supplying carrier signal information as digital data,
   baseband signal converting means for converting said baseband signal into a plurality of digital amplitude information in phases different from each other,
   phase information converting means for converting said carrier signal information into the same number of digital phase information as that of said amplitude information, which digital phase information are shifted by a predetermined amount from each other,
   storing means of the same number as those of said amplitude information and phase information, each of said storing means storing data indicative of a multiplication result of the corresponding one of said amplitude information and said carrier signal at an address designated by the corresponding one of said plurality of amplitude information and the corresponding one of said plurality of phase information,
   means for adding in a digital manner the plurality of data read from said plurality of storing means based on said plurality of amplitude information and said plurality of phase information, and
   means for converting the output of said digital adding means into an analog signal and supplying the analog signal.

2. The digital modulator according to claim 1, wherein said baseband signal converting means includes vector coordinate generating means for converting said digital baseband signal into an I phase signal component, a Q phase signal component, an I' phase signal component corresponding to a signal component with respect to an I, axis obtained by rotating an I axis by $\pi/4$ and a Q' phase signal component corresponding to a signal component with respect to an Q, axis which is orthogonal to said I' axis.

3. The digital modulator according to claim 2, wherein said phase information converting means includes phase shifting means for converting said carrier signal information into four digital phase information different from each other by $\pi/4$.

4. The digital modulator according to claim 3, wherein each of said plurality of storing means includes:
   first storing means for receiving the Q' phase signal component supplied from said coordinate generating means and digital phase information obtained by shifting the phase of said carrier signal information by $3\pi/4$ as addresses, respectively,
   second storing means for receiving the Q phase signal component supplied from said coordinate generating means and digital phase information obtained by shifting the phase of said carrier signal information by $\pi/2$ as addresses, respectively,
   third storing means for receiving the I' phase signal component supplied from said coordinate generating means and digital phase information obtained by shifting the phase of said carrier signal information by $\pi/4$ as addresses, respectively, and
   fourth storing means for receiving the I phase signal component supplied from said coordinate generating means and said carrier signal information as addresses, respectively.

5. The digital modulator according to claim 4, further comprising digital filter means provided between said vector coordinate generating means and said first to fourth storing means,
   said digital filter means including fifth to eighth storing means for storing predetermined filter response waveforms at addresses designated by said signal components of the I phase, the Q phase, the I' phase and the Q' phase as well as said carrier signal information.

6. The digital modulator according to claim 1, further comprising digital filter means provided between said baseband signal converting means and said plurality of storing means for limiting the bandwidth of the amplitude information supplied from said baseband signal converting means.

7. The digital modulator according to claim 1, wherein data stored in each of said plurality of storing means indicates a multiplication result of the corresponding amplitude information signal having its bandwidth limited and said carrier signal.

8. A digital modulator comprising:
   means for supplying a digital baseband signal,
   means for supplying carrier signal information as digital data, baseband signal converting means for converting said baseband signal into a plurality of digital amplitude information in phases different from each other, storing means of the same number as that of said amplitude information, each of said storing means storing data indicative of a multiplication result of the corresponding one of said amplitude information and said carrier signal at an address designated by the corresponding one of said plurality of amplitude information and phase information, means for adding in a digital manner the plurality of data read from said plurality of storing means based on said plurality of amplitude information and said phase information, and means for converting the output of said digital adding means into an analog signal and supplying the analog signal.

9. The digital modulator according to claim 8, further comprising phase information converting means for converting said carrier signal information into the same number of digital phase information as that of said amplitude information, which digital phase information are shifted by a predetermined amount from each other.

10. The digital modulator according to claim 8, wherein data stored in each of said plurality of storing means indicates a multiplication result of the corresponding amplitude information signal having its bandwidth limited and said carrier signal.

11. A baseband signal generator comprising:
means for supplying a digital baseband signal,
baseband signal converting means for converting said baseband signal into a plurality of amplitude information in phases different from each other,
digital filter means for limiting the bandwidth of the amplitude information supplied from said baseband signal converting means, and
arithmetic means for executing predetermined operation of the outputs of said digital filter means and supplying an in-phase signal component and a quadrature signal component of the baseband signal.

12. The baseband signal generator according to claim 11, wherein said baseband signal converting means includes vector coordinate generating means for converting said baseband signal into an I phase signal component, a Q phase signal component, an I' phase signal component and a Q' phase signal component.

13. The baseband signal generator according to claim 12, further comprising a source for supplying time passage information, wherein said digital filter means includes storing means for storing predetermined filter response waveforms at addresses designated by said signal components of the I phase, the Q phase, the I' phase and the Q' phase and said time passage information.

* * * * *